United States Patent
Li et al.

(10) Patent No.: US 12,056,324 B1
(45) Date of Patent: Aug. 6, 2024

(54) TOUCH ELECTRODE, TOUCH MODULE, AND TOUCH DISPLAY PANEL

(71) Applicant: HKC CORPORATION LIMITED, Shenzhen (CN)

(72) Inventors: Wang Li, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/212,187

(22) Filed: Jun. 21, 2023

(30) Foreign Application Priority Data

Feb. 27, 2023 (CN) .......................... 202310209185.6

(51) Int. Cl.
G06F 3/044 (2006.01)
G06F 3/041 (2006.01)

(52) U.S. Cl.
CPC .......... *G06F 3/0448* (2019.05); *G06F 3/0412* (2013.01); *G06F 3/0443* (2019.05); *G06F 3/0446* (2019.05); *G06F 2203/04111* (2013.01)

(58) Field of Classification Search
None
See application file for complete search history.

(56) References Cited

U.S. PATENT DOCUMENTS

2014/0347299 A1* 11/2014 Lu .......................... G06F 3/0446 345/173
2018/0210576 A1 7/2018 Zhang et al.
2019/0050076 A1* 2/2019 Zhang .................... G06F 3/0448
2019/0391694 A1 12/2019 Lin et al.
2021/0405820 A1* 12/2021 Ye .......................... G06F 3/0448
2022/0317811 A1* 10/2022 Wang .................... G06F 3/0445

FOREIGN PATENT DOCUMENTS

| CN | 105183204 A | 12/2015 |
|---|---|---|
| CN | 206388148 U | 8/2017 |
| CN | 107562273 A | 1/2018 |
| CN | 107977114 A | 5/2018 |
| CN | 108447889 A | 8/2018 |

(Continued)

OTHER PUBLICATIONS

International Search Report, International Application No. PCT/CN2023/097225, mailed Sep. 21, 2023 (16 pages).

(Continued)

*Primary Examiner* — Duane N Taylor, Jr.

(57) ABSTRACT

This application provides a touch electrode, a touch module, and a touch display panel. The touch electrode at least includes a first touch subunit, a second touch subunit, and a third touch subunit. The first touch subunit surrounds the second touch subunit and defines a first gap and a second gap, to divide the first touch subunit into a first extension part and a second extension part. The second touch subunit surrounds the third touch subunit and has a third gap and a fourth gap, to divide the second touch subunit into a third extension part and a fourth extension part. A first connecting part passes through the third gap and connects the first extension part and the third touch subunit, and a second connecting part passes through the fourth gap and connects the second extension part and the third touch subunit.

20 Claims, 8 Drawing Sheets

(56) References Cited

FOREIGN PATENT DOCUMENTS

| CN | 207780739 U | | 8/2018 | | |
|---|---|---|---|---|---|
| CN | 110109579 A | * | 8/2019 | ........... | G06F 3/0412 |
| CN | 110658952 A | * | 1/2020 | ........... | G06F 3/0412 |
| CN | 110989875 A | | 4/2020 | | |
| CN | 112313610 A | | 2/2021 | | |
| CN | 113220150 A | | 8/2022 | | |
| KR | 20180031883 A | | 3/2018 | | |
| WO | 2021184292 A1 | | 9/2021 | | |
| WO | 2023004843 A1 | | 2/2023 | | |

OTHER PUBLICATIONS

Chinese Notification to Grant Patent Right for Invention, Chinese Application No. 202310209185.6, mailed Jan. 4, 2024 (6 pages).

* cited by examiner

TOUCH ELECTRODE, TOUCH MODULE, AND TOUCH DISPLAY PANEL

CROSS-REFERENCE TO RELATED DISCLOSURES

The present disclosure claims priority to Chinese patent disclosure No. 202310209185.6, filed on Feb. 27, 2023, the contents of all of which are hereby incorporated by reference.

TECHNICAL FIELD

The present disclosure relates to the field of touch technologies, in particular to a touch electrode, a touch module, and a touch display panel.

BACKGROUND

Electronic devices have penetrated into every aspect of people's lives, and touch screens have become the mainstream information exchange means of electronic devices due to their simple and direct operation characteristics. With the continuous progress of society, the requirements of electronic device users for touch screens in various aspects are also constantly increasing. However, with the emergence of special application scenarios, such as the emergence of new needs such as wearing gloves for touch control and slight contact gesture recognition, the current touch structure has poor touch accuracy and sensitivity, which cannot meet the product performance requirements very well.

An existing touch display panel has a simple pattern structure and a small effective touch area. Although it can meet the daily simple use, under some special conditions, such as wearing gloves, gesture recognition and other application scenarios, the effective touch area is small, the touch sensitivity is insufficient and the recognition accuracy is poor, which is not conducive to the user's product experience.

SUMMARY OF THE DISCLOSURE

The present disclosure provides a touch electrode, the touch electrode at least includes a first touch subunit, a second touch subunit, a third touch subunit, a first connecting part, a second connecting part, a third connecting part, a fourth connecting part, and a first bridging part.

The first touch subunit surrounds the second touch subunit. The first touch subunit defines a first gap and a second gap, the first touch subunit is divided into a first extension part and a second extension part by the first gap and the second gap.

The second touch subunit surrounds the third touch subunit. The second touch subunit defines a third gap and a fourth gap, the second touch subunit is divided into a third extension part and a fourth extension part by the third gap and the fourth gap.

The first connecting part passes through the third gap and is connected to the first extension part and the third touch subunit. The second connecting part passes through the fourth gap and is connected to the second extension part and the third touch subunit, so that the first extension part is electrically connected to the second extension part through the third touch subunit.

The third connecting part is electrically connected to the second touch subunit and passes through the first gap to extend beyond an area formed by the first touch subunit. The fourth connecting part is electrically connected to the second touch subunit and passes through the second gap to extend beyond an area formed by the first touch subunit.

The third extension part is electrically connected to the fourth extension part through the first bridging part.

In a specific embodiment, the touch electrode further includes an insulation layer having a first side and a second side opposite to the first side, wherein the first touch subunit, the second touch subunit, and the third touch subunit are located on the first side and on the same layer; and the first bridging part is located on the second side.

In a specific embodiment, the outer contours of the first touch subunit, the second touch subunit, and the third touch subunit are quadrilateral, the first gap and the second gap are respectively arranged on two adjacent or opposite sides of the first touch subunit, and the third gap and the fourth gap are respectively arranged on two adjacent sides or opposite sides of the second touch subunit.

In a specific embodiment, the outer contours of the first touch subunit, the second touch subunit, and the third touch subunit are diamond shaped, the first gap and the second gap are respectively arranged on two adjacent sides of the first touch subunit.

In a specific embodiment, the touch electrode only includes one first bridging part, the first bridging part corresponds to the third gap or the fourth gap, and the third extension part and the fourth extension part are electrically connected through the first bridging part; or the touch electrode includes two first bridging parts respectively corresponding to the third gap and the fourth gap, the third extension part and the fourth extension part are electrically connected at the third gap through one first bridging part, and the third extension part and the fourth extension part are electrically connected at the fourth gap through another first bridging part.

The present disclosure further provides a touch module including a plurality of touch electrodes.

The plurality of touch electrodes are arranged in an array and connected to form a plurality of touch driving channels extending along a first direction and a plurality of touch detection channels extending along the second direction, and the first direction intersects with the second direction.

The plurality of touch electrodes are any one of the touch electrodes mentioned above.

In a specific embodiment, the plurality of touch electrodes include a plurality of first touch electrodes and a plurality of second touch electrodes, the touch module includes a plurality of touch electrode units arranged in an array, and the touch electrode units include two first touch electrodes and two second touch electrodes.

The two first touch electrodes are arranged along the first direction.

The two second touch electrodes are arranged along the second direction. The plurality of touch electrode units are arranged on the same layer, the first direction is perpendicular to the second direction, the first touch subunit and the third touch subunit of the first touch electrode serve as the touch driving channels, and the second touch subunit of the first touch electrode serves as the touch detection channel; the second touch subunit of the second touch electrode serves as the touch driving channel, and the first touch subunit and the third touch subunit of the second touch electrode serve as the touch detection channel.

In a specific embodiment, the touch electrode unit further includes a fifth connecting part, the fifth connecting part and the touch electrode are arranged on the same layer, and the first touch subunits of two first touch electrodes of the same touch electrode unit are electrically connected through the fifth connecting part; and the first touch subunits of two second touch electrodes of the same touch electrode unit are electrically connected through the second touch subunit of the first touch electrode.

In a specific embodiment, the touch electrode further includes a plurality of second bridging parts, the plurality of touch electrode units include a plurality of first touch electrode units and a plurality of second touch electrode units.

The plurality of first touch electrode units are arranged in a plurality of rows along the first direction.

The plurality of second touch electrode units are arranged in a plurality of columns along the second direction.

The first touch subunits of two adjacent first touch electrode units in the same row are electrically connected through the second touch subunits of adjacent second touch electrode units; and the first touch subunits of two adjacent second touch electrode units in the same column are electrically connected through the second bridging part.

The present disclosure further provides a touch display panel including a display module and a touch module. The display module includes a display area, and the touch module is located within the display area. The touch module is any one of the touch modules mentioned above.

BRIEF DESCRIPTION OF THE DRAWINGS

In order to provide a clearer explanation of the technical solution in the embodiments of the present disclosure, a brief introduction will be given to the accompanying drawings required in the description of the embodiments. It is evident that the accompanying drawings in the following description are only some embodiments of the present disclosure. For ordinary technical personnel in the art, other accompanying drawings can be obtained based on these drawings without any creative labor.

Explanation of the attached drawing labels: 1—first touch subunit; 11—first gap; 12—second gap; 13—first extension part; 14—second extension part; 2—second touch subunit; 21—third gap; 22—fourth gap; 23—third extension part; 24—fourth extension part; 3—third touch subunit; 4—first connecting part; 5—second connecting part; 6—third connecting part; 7—fourth connecting part; 8—first bridging part; 9—fifth connecting part; 10—touch electrode; 101—first touch electrode; 102—second touch electrode; 103—third touch electrode; 104—fourth touch electrode; 20—touch module; 201—substrate; 202—bridge pattern layer; 203—insulation layer; 203a—lap hole; 204—touch pattern layer; 205—protective layer; 20A—touch electrode unit; 20A1—first touch electrode unit; 20A2—second touch electrode unit; 100—touch display panel; B—second bridging part; X—first direction; Y—second direction.

DETAILED DESCRIPTION

The following will provide a clear and complete description of the technical solution in the embodiments of the present disclosure in conjunction with the accompanying drawings. Obviously, the described embodiments are only a part of the embodiments of the present disclosure, not all of them. Based on the embodiments in the present disclosure, all other embodiments obtained by ordinary technical personnel in this field without creative labor fall within the scope of protection in the present disclosure.

In the following description, specific details such as specific system architecture, interfaces, technologies, etc. are proposed for the purpose of illustration rather than limitation, in order to fully understand the present disclosure.

The terms "first", "second", and "third" in the present disclosure are only used for descriptive purposes and cannot be understood as indicating or implying relative importance or implying the quantity of technical features indicated. Therefore, features limited to "first", "second", and "third" can explicitly or implicitly include at least one of these features. In the description of the present disclosure, "multiple" means at least two, such as two, three, etc., unless otherwise specified. All directional indications (such as up, down, left, right, front, rear . . . ) in the embodiments of the present disclosure are only used to explain the relative position relationship, motion situation, etc. between components in a specific posture (as shown in the attached figure). If the specific posture changes, the directional indication also changes accordingly. In addition, the terms "including", "comprising" and "having", as well as any variations of them, are intended to cover non-exclusive inclusions. For example, a process, method, system, product, or device that includes a series of steps or units is not limited to the listed steps or units, but optionally includes steps or units that are not listed, or optionally includes other steps or units that are inherent to these processes, methods, products, or devices.

The reference to "embodiments" in the present disclosure means that specific features, structures, or characteristics described in conjunction with the embodiments can be included in at least one embodiment of the present disclosure. The phrase appearing in various positions in the specification does not necessarily refer to the same embodiment, nor is it an independent or alternative embodiment that is mutually exclusive with other embodiments. Technicians in this field explicitly and implicitly understand that the embodiments described in the present disclosure can be combined with other embodiments.

At present, electronic devices have penetrated into every aspect of people's lives, and touch screens and touch display panels have become the mainstream information exchange means in electronic devices due to their simple and direct operation characteristics. With the continuous progress of society, the requirements of electronic device users for touch display panels in various aspects are also constantly increasing. Specifically, the implementation of touch is achieved by scanning the capacitance of the touch sensing channel through charging and discharging, sensing changes in the sensing channel capacitance corresponding to the finger touch area, thereby achieving touch positioning and point reporting. Improving touch sensing sensitivity plays an important role in improving touch performance.

In the related art, the touch electrode of the existing touch module is rectangular, the pattern of the touch module is simple, the effective touch area is small, and the bridge area is large, which will affect the display effect. Although the existing touch display panel can meet the daily simple use, under some special conditions, such as wearing gloves, gesture recognition and other application scenarios, the touch sensitivity and recognition accuracy are poor, which is not conducive to the user's product experience.

The present disclosure provides a touch electrode, a touch module, and a touch display panel, which mainly solves the technical problems that the existing touch display panel has a small effective touch area, insufficient touch sensitivity, and poor recognition accuracy, which is not conducive to the user's product experience.

The touch electrode, touch module, and touch display panel provided in the present disclosure can not only increase the effective area of touch, but also increase the capacitance value of a single point, accuracy and sensitivity of recognition, improve touch performance, and expand application scenarios in practical use.

The following provides a detailed explanation of the present disclosure in conjunction with the accompanying drawings and embodiments.

Figure 1:
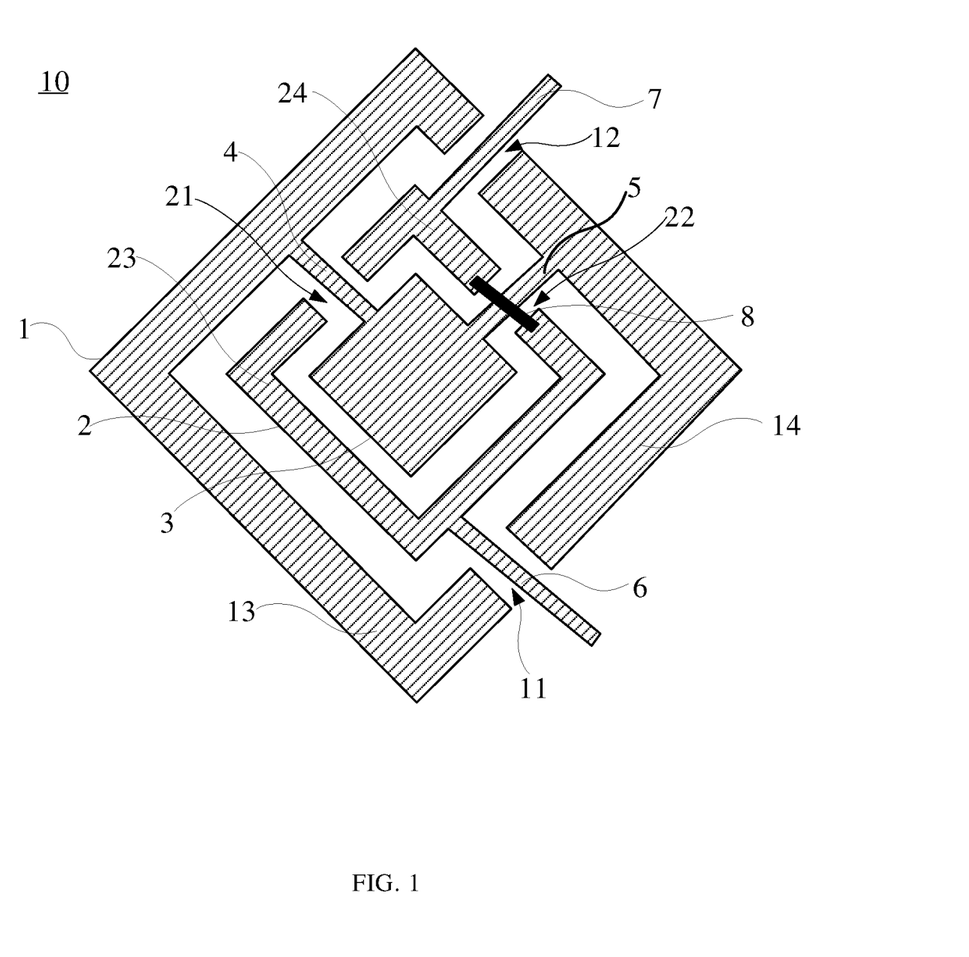
FIG. 1 is a structural schematic view of a touch electrode provided by an embodiment of the present disclosure.

Referring to FIG. 1, FIG. 1 is a structural schematic view of a touch electrode provided by an embodiment of the present disclosure. In an embodiment, a touch electrode 10 is provided, the touch electrode 10 includes a first touch subunit 1, a second touch subunit 2, a third touch subunit 3, a first connecting part 4, a second connecting part 5, a third connecting part 6, a fourth connecting part 7, and a first bridging part 8.

Referring to FIG. 1, the first touch subunit 1 surrounds the second touch subunit 2, and the first touch subunit 1 has a first gap 11 and a second gap 12. The first gap 11 and the second gap 12 divide the first touch subunit 1 into a first extension part 13 and a second extension part 14. The second touch subunit 2 surrounds the third touch subunit 3, and the second touch subunit 2 has a third gap 21 and a fourth gap 22. The third gap 21 and the fourth gap 22 divide the second touch subunit 2 into a third extension part 23 and a fourth extension part 24. The first connecting part 4 passes through the third gap 21 and is connected to the first extension part 13 and the third touch subunit 3, while the second connecting part 5 passes through the fourth gap 22 and is connected to the second extension part 14 and the third touch subunit 3, so that the first extension part 13 is electrically connected to the second extension part 14 through the third touch subunit 3. The third connecting part 6 is electrically connected to the second touch subunit 2 and passes through the first gap 11 to extend beyond the area formed by the first touch subunit 1. The fourth connecting part 7 is electrically connected to the second touch subunit 2 and passes through the second gap 12 to extend beyond the area formed by the first touch subunit 1.

The outer contours of the first touch subunit 1, the second touch subunit 2, and the third touch subunit 3 are not limited. In an embodiment, the outer contours of the first touch subunit 1, the second touch subunit 2, and the third touch subunit 3 are all quadrilaterals, such as rectangles, squares, or diamonds. The first gap 11 and the second gap 12 are respectively arranged on two adjacent or opposite sides of the first touch subunit 1, and the third gap 21 and the fourth gap 22 are respectively arranged on two adjacent or opposite sides of the second touch subunit 2.

Figure 2:
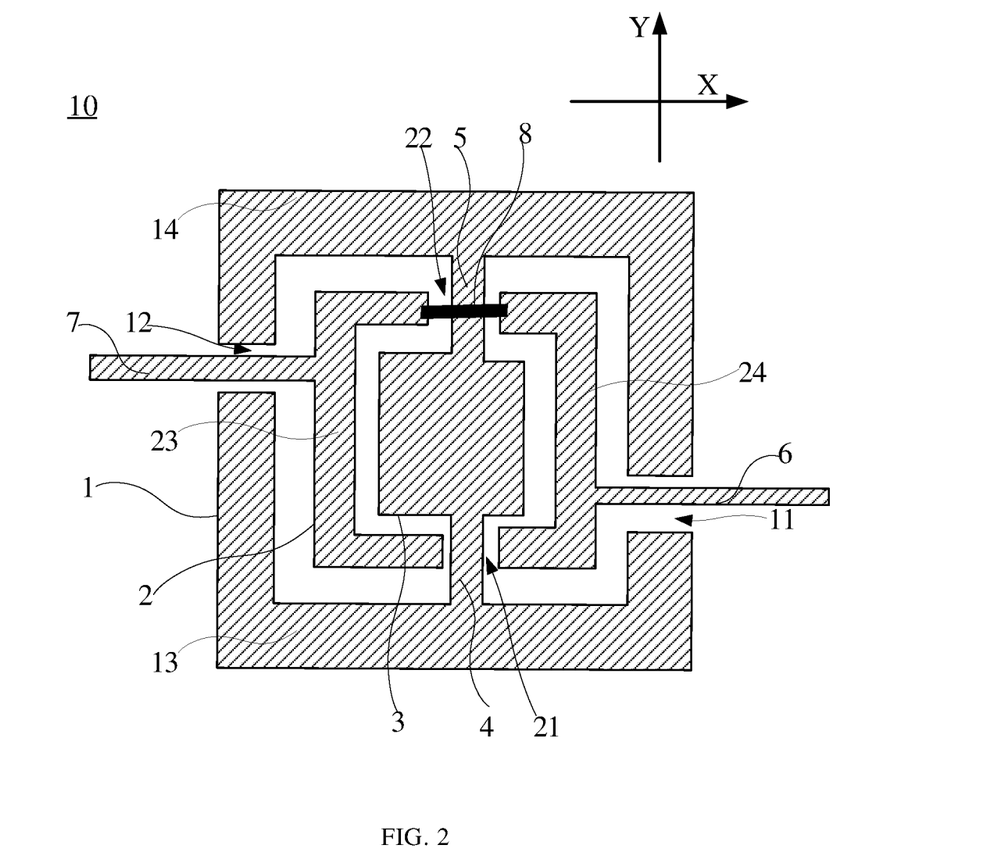
FIG. 2 is a structural schematic view of the touch electrode provided by another embodiment of the present disclosure.

Furthermore, as shown in FIG. 1, in an embodiment, the outer contours of the first touch subunit 1, the second touch subunit 2, and the third touch subunit 3 are all diamond shaped. The first gap 11 and the second gap 12 are respectively arranged on two adjacent sides of the first touch subunit 1, and the third gap 21 and the fourth gap 22 are respectively arranged on two adjacent sides of the second touch subunit 2. In another embodiment, referring to FIG. 2, FIG. 2 is a structural schematic view of the touch electrode provided by another embodiment of the present disclosure. The first gap 11 and the second gap 12 are respectively arranged on the two opposite sides of the first touch subunit 1 along the first direction X, and the third gap 21 and the fourth gap 22 are respectively arranged on the two opposite sides of the second touch subunit 2 along the second direction Y, and the first direction X and the second direction Y are perpendicular to each other.

As shown in FIG. 1, in this embodiment, the touch electrode 10 only includes a first bridging part 8 that corresponds to the third gap 21 or the fourth gap 22 (in FIG. 1, the first bridging part 8 corresponds to the fourth gap 22). Furthermore, the third extension part 23 is electrically connected to the fourth extension part 24 through the first bridging part 8. The first touch subunit 1, the second touch subunit 2, and the third touch subunit 3 are cross connected, which can increase the effective area of touch control.

Specifically, the material of first bridging part 8 is a metal, such as silver (Ag), copper (Cu), aluminum (Al), molybdenum (Mo); or alloy materials of the aforementioned metals, such as aluminum niobium alloy (AlNd), molybdenum niobium alloy (MoNb), and so on. The length of the first bridging part 8 is in a range from 4.5 μm to 5.5 μm, and the width is in a range from 1.5 μm to 2.5 μm. The first bridging part 8 is configured to bridge the third extension part 23 and the fourth extension part 24 of the touch electrode 10, rather than adjacent touch electrodes 10. Therefore, the first bridging part 8 significantly shortens its length and width, effectively reducing the metal density inside the touch electrode 10, improving the display effect, reducing the visibility of the metal bridging part inside the touch electrode 10, and further improving the performance of the product using the touch electrode 10.

Figure 3:
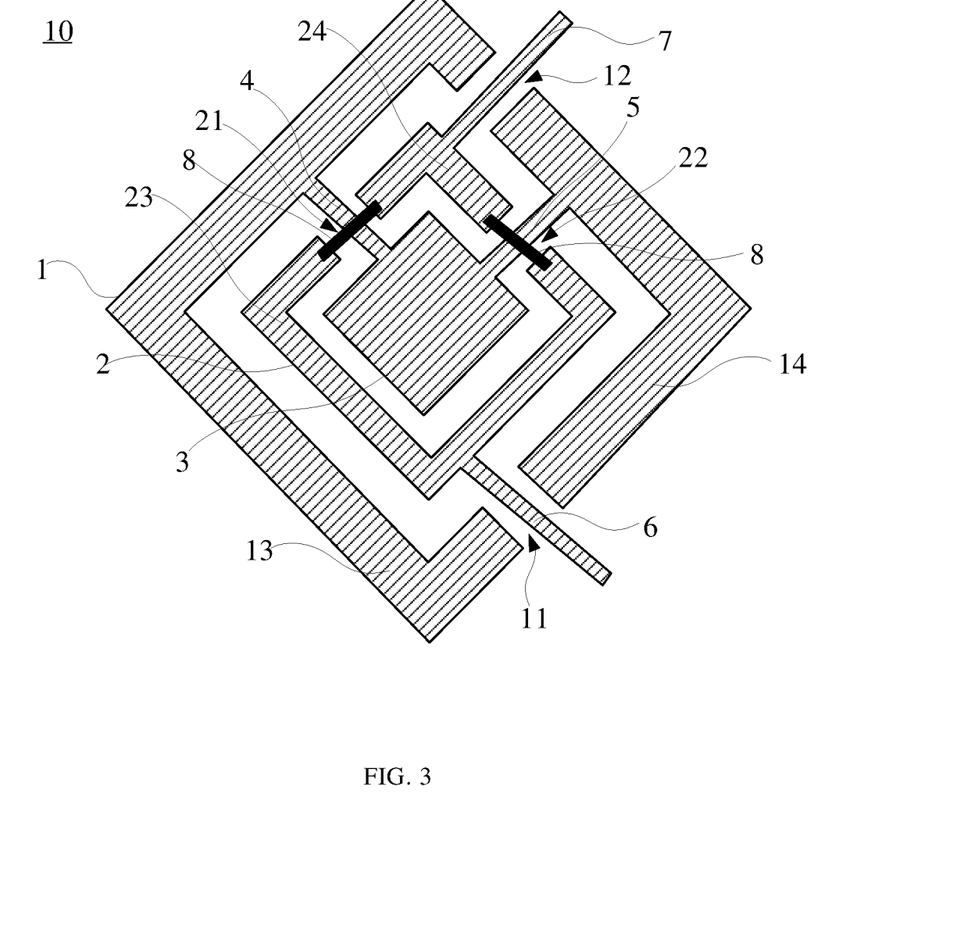
FIG. 3 is a structural schematic view of the touch electrode provided by yet another embodiment of the present disclosure.

In the specific embodiment, as shown in FIG. 3, FIG. 3 is a structural schematic view of the touch electrode provided by yet another embodiment of the present disclosure. The difference between this embodiment and the above embodiment is that the touch electrode 10 in this embodiment includes two first bridging parts 8. The two first bridging parts 8 correspond to the third gap 21 and the fourth gap 22, respectively. The third extension part 23 is electrically connected to the fourth extension part 24 by the first bridging part 8 at the third gap 21, and the third extension part 23 is electrically connected to the fourth extension part 24 by another first bridging part 8 at the fourth gap 22. The connection of the two first bridging parts 8 can make the third extension part 23 and the fourth extension part 24 of the touch electrode 10 more stable, increasing the stability of the touch electrode 10, avoid the failure of the connection between the third extension 23 and the fourth extension 24 caused by the fracture of one of the two first bridging parts 8.

Figure 8:
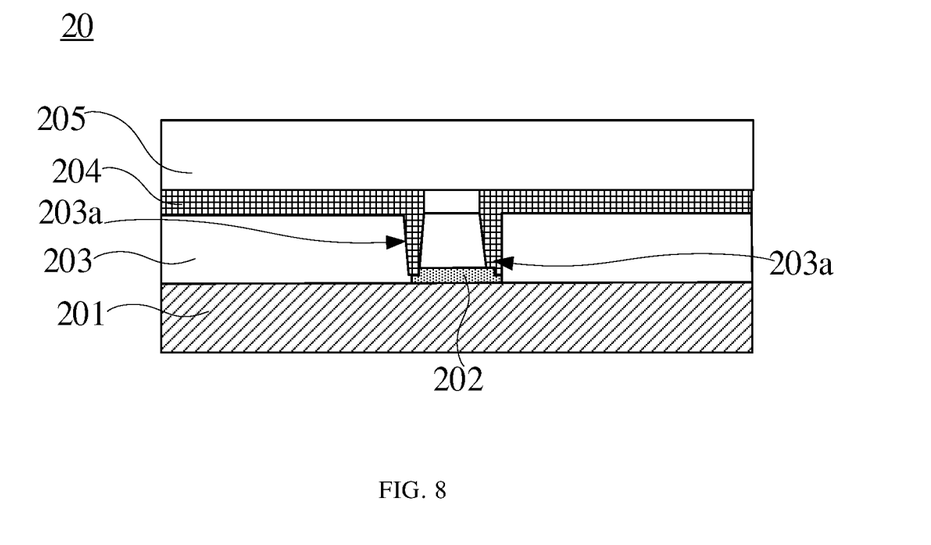
FIG. 8 is a cross-sectional structural schematic view of the touch module provided by an embodiment of the present disclosure.

In the specific implementation example, as shown in FIG. 8, the touch electrode 10 also includes an insulation layer 203. The touch pattern layer 204 formed by the first touch subunit 1, the second touch subunit 2, and the third touch subunit 3 is arranged on one side of the insulation layer 203; and the bridge pattern layer 202 where the first bridging part 8 is located is arranged on the opposite side of the insulation layer 203. The first touch subunit 1, the second touch subunit 2, and the third touch subunit 3 are located on the same layer. Specifically, the insulating layer 203 is usually an insulating material, which can be made of silicon oxide (SiOx), silicon nitride (SiNx), silicon oxynitride (SiONO, and so on, and can also be a single layer, multiple layers or composite layers. In an embodiment, the insulation layer 203 is a silicon nitride insulation layer.

The touch electrode 10 in the present disclosure embodiment at least includes the first touch subunit 1, the second touch subunit 2, and the third touch subunit 3. In the specific implementation process, more subunits can be designed.

Figure 4:
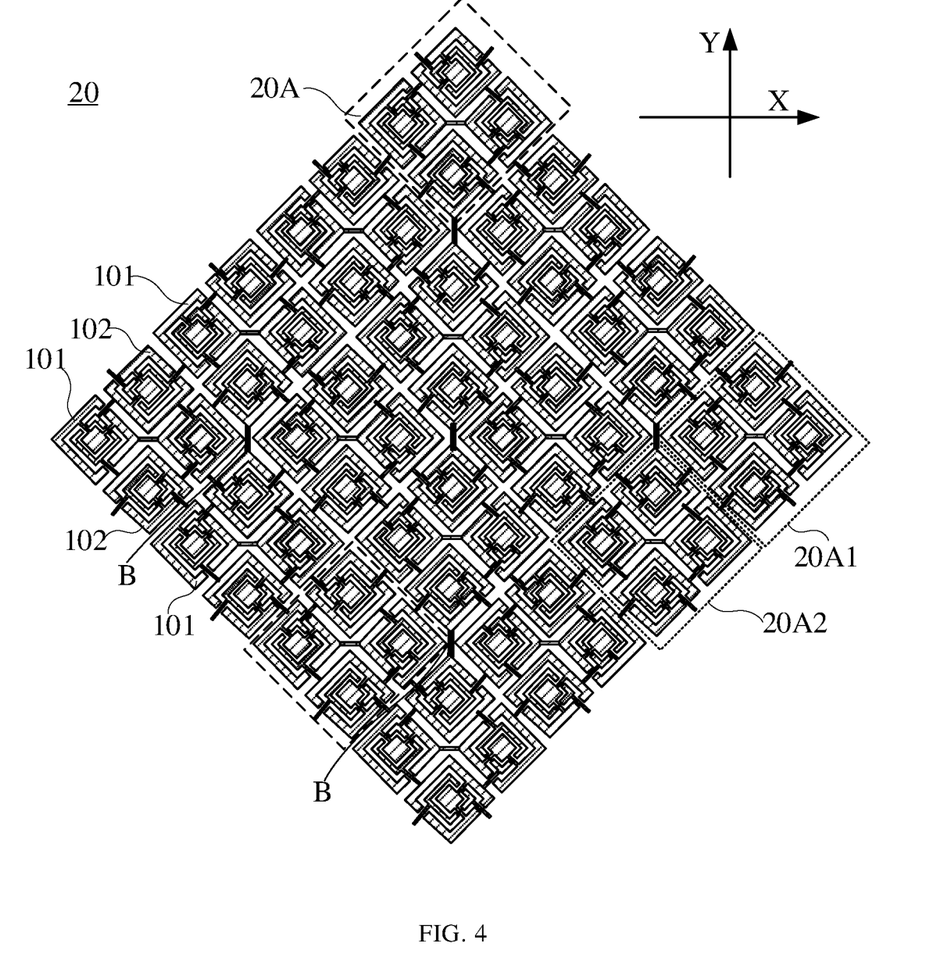
FIG. 4 is a structural schematic view of a touch module provided by an embodiment of the present disclosure.

Referring to FIG. 4, FIG. 4 is a structural schematic view of a touch module provided by an embodiment of the present disclosure. In this embodiment, a touch module 20 is provided, and the touch module 20 includes multiple touch electrodes 10. The multiple touch electrodes 10 are arranged in an array and connected to form multiple touch driving channels extending along the first direction X and multiple touch detection channels extending along the second direction Y, and the first direction X and the second direction Y intersect with each other. The touch electrode 10 is any of the touch electrodes 10 mentioned above. Multiple touch electrodes 10 include multiple first touch electrodes 101 and multiple second touch electrodes 102. Specifically, the first direction X and the second direction Y are perpendicular to each other.

In a specific embodiment, the touch module 20 includes multiple touch electrode units 20A arranged in an array.

Figure 5:
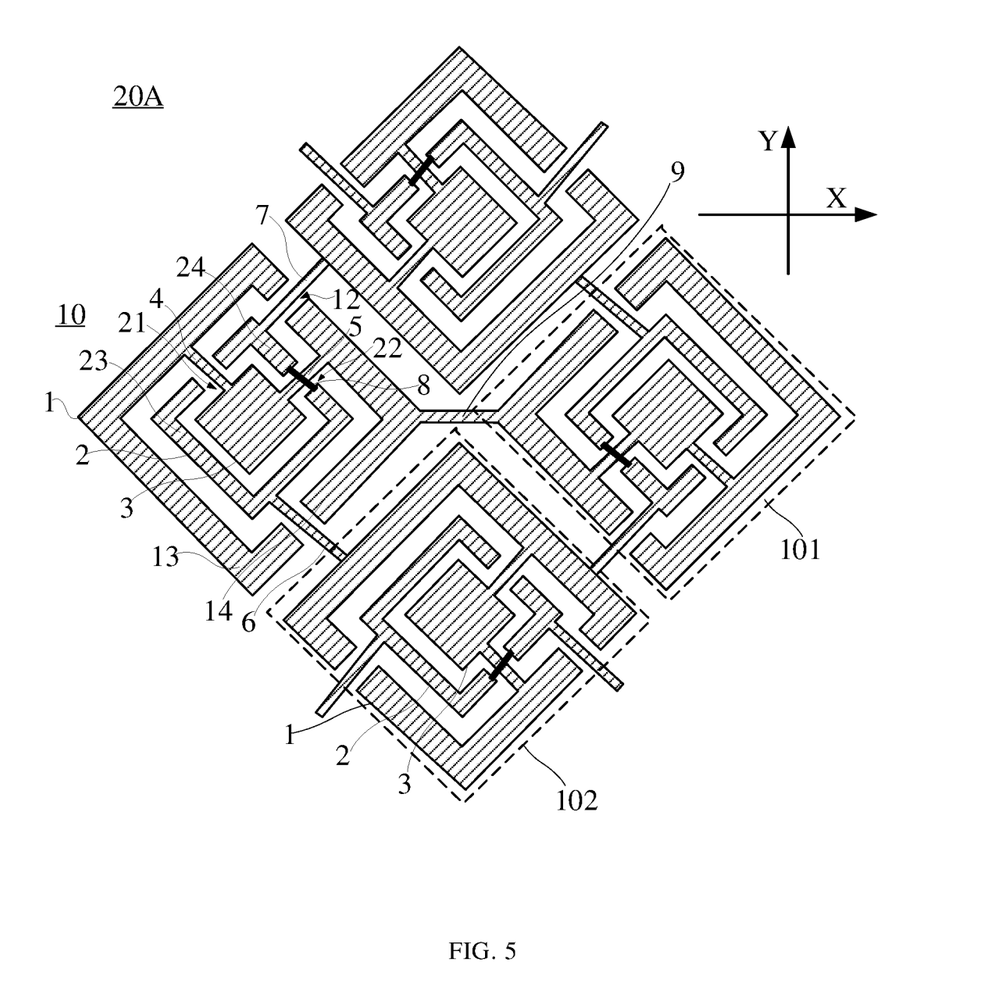
FIG. 5 is a structural schematic view of a touch electrode unit provided by an embodiment of the present disclosure.

Further referring to FIG. 5, FIG. 5 is a structural schematic view of a touch electrode unit provided by an embodiment of the present disclosure. FIG. 5 is also an enlarged structural schematic view of the structure in the dashed box in FIG. 4. The touch electrode unit 20A includes two first touch electrodes 101 and two second touch electrodes 102, the two first touch electrodes 101 are arranged along the first direction X, and the two second touch electrodes 102 are arranged along the second direction Y.

Referring to FIGS. 1, 4, and 5, multiple touch electrode units 20A are arranged on the same layer. The first touch subunit 1 and the third touch subunit 3 of the first touch electrode 101 serve as the touch driving channels, and the second touch subunit 2 of the first touch electrode 101 serves as the touch detection channel. The second touch subunit 2 of the second touch electrode 102 serves as the touch driving channel, and the first touch subunit 1 and third touch subunit 3 of the second touch electrode 102 serve as the touch detection channel.

The first touch subunit 1 and the third touch subunit 3 of the first touch electrode 101 can also serve as the touch detection channels, and at this time, the second touch subunit 2 of the first touch electrode 101 serves as the touch driving channel. The second touch subunit 2 of the second touch electrode 102 can serve as the touch detection channel, and at this time, the first touch subunit 1 and the third touch subunit 3 of the second touch electrode 102 serve as the touch driving channels.

The touch driving channel and the touch detection channel are formed in the first direction X and the second direction Y, and the touch driving channel and touch detection channel are insulated from each other, so that each touch electrode unit 20A has the touch driving channel and the touch detection channel to achieve multi-point positioning function, thereby increasing the single point capacitance value, recognition accuracy, and touch sensitivity.

Further referring to FIG. 5, the touch electrode unit 20A includes a fifth connecting part 9. The fifth connecting part 9 and the touch electrode 10 are arranged on the same layer, and the first touch subunits 1 of the two first touch electrodes 101 of the same touch electrode unit 20A are electrically connected through the fifth connecting part 9. The first touch subunits 1 of the two second touch electrodes 102 of the same touch electrode unit 20A are electrically connected through the second touch subunit 2 of the first touch electrode 101. The first touch subunits 1 of the two second touch electrodes 102 of the same touch electrode unit 20A can be electrically connected through the second touch subunit 2 of one first touch electrode 101, or through the second touch subunits 2 of two first touch electrodes 101, to increase stability and detection accuracy.

Further referring to FIG. 4, the touch module 20 includes multiple second bridging parts B, and the multiple touch electrode units 20A include multiple first touch electrode units 20A1 and multiple second touch electrode units 20A2. Specifically, multiple first touch electrode units 20A1 are arranged in multiple rows along the first direction X; multiple second touch electrode units 20A2 are arranged in multiple columns along the second direction Y. The first touch subunits 1 of the two adjacent first touch electrode units 20A1 in the same row are electrically connected through the second touch subunit 2 of the adjacent second touch electrode unit 20A2. The first touch subunits 1 of two adjacent second touch electrode units 20A2 in the same column are electrically connected through the second bridge connection part B. The length and width of the second bridging part B are greater than those of the first bridging part 8. In an embodiment, the length of the second bridging part B is in a range from 119.5 μm to 200.5 μm, and the width is in a range from 9.5 μm to 10.5 μm.

The touch module 20 in FIG. 4 includes multiple touch driving channels extending along the first direction X and multiple touch detection channels extending along the second direction Y. The driving method of touch module 20 in FIG. 4 includes the following steps: first driving the first touch driving channel, and sequentially detecting and determining the contact position through multiple touch detection channels; then driving the second touch driving channel, and sequentially detecting and determining the contact position through multiple touch detection channels; and by analogy, sequentially driving multiple touch driving channels, and after driving each touch driving channel, sequentially detecting and determining the contact position through multiple touch detection channels.

Figure 6:
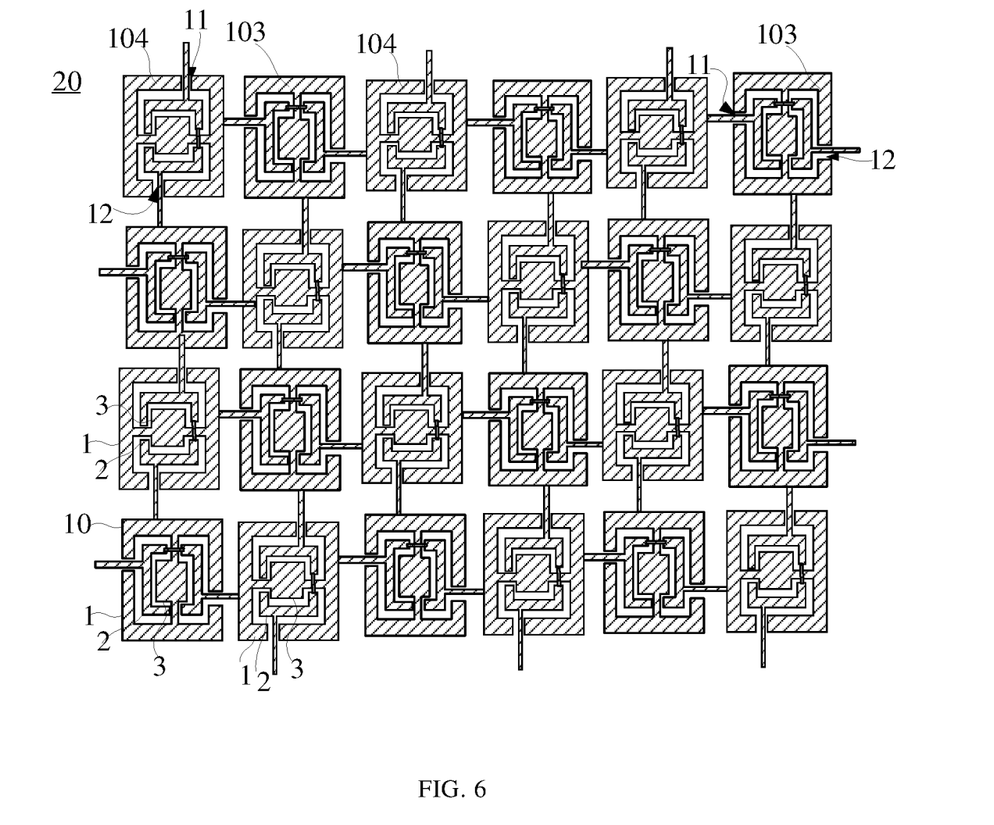
FIG. 6 is a structural schematic view of the touch module provided by another embodiment of the present disclosure.

Referring to FIG. 6, FIG. 6 is a structural schematic view of the touch module provided by another embodiment of the present disclosure. This embodiment provides another touch module 20, the touch module 20 also includes multiple touch electrodes 10. The difference from the above touch module 20 is that the specific structure of the multiple touch electrodes 10 is shown in FIG. 2. Multiple touch electrodes 10 are arranged in a two-dimensional array and connected to form multiple touch driving channels extending along the first direction X and multiple touch detection channels extending along the second direction Y, and the first direction X is perpendicular to the second direction Y. Specifically, the outer contour of the touch electrode 10 is square, and one set of opposite sides of the square is parallel to the first direction X, while the other set of opposite sides is parallel to the second direction Y. Multiple touch electrodes 10 form multiple rows in the first direction X and multiple columns in the second direction Y. In the multiple touch electrodes 10 located in odd rows, the first touch subunit 1 and the third touch subunit 3 of the odd-th touch electrodes 10 along the first direction X serves as the touch detection channels, and the second touch subunit 2 serves as the touch driving channel; and the first touch subunit 1 and the third touch subunit 3 of the even-th touch electrodes 10 serve as the touch driving channels, and the second touch subunit 2 serves as the touch detection channel. In the multiple touch electrodes 10 located in even rows, the first touch subunit 1 and the third touch subunit 3 of the even-th touch electrode 10 along the first direction X serve as the touch detection channels, and the second touch subunit 2 serves as the touch driving channel; and the first touch subunit 1 and the third touch subunit 3 of the odd-th touch electrode 10 serve as the touch driving channels, and the second touch subunit 2 serves as the touch detection channel. The first touch subunits 1 of two adjacent odd-th touch electrodes 10 located in the same row is connected through the second touch subunit 2 of the even-th touch electrodes 10 between the two adjacent odd-th touch electrodes 10. The first touch subunit 1 of two adjacent odd-th touch electrodes 10 located in the same column is connected through the second touch subunit 2 of the even-th touch electrodes 10 between the two adjacent odd-th touch electrodes 10. The touch driving channel and the touch detection channel are formed in the first direction X and the second direction Y, and the touch driving channel and touch detection channel are insulated from each other. This arrangement structure does not require the second bridging part B, and this arrangement structure is simple, which effectively reduces the area of metal inside of the touch electrode 10, improves the display effect, and reduces the visibility of the metal bridging part inside of the touch electrode 10.

The structure shown in FIG. 6 above can also be understood as multiple touch electrodes 10 including multiple third touch electrodes 103 and multiple fourth touch electrodes 104. Multiple third touch electrodes 103 and multiple fourth touch electrodes 104 are arranged into a two-dimensional array. Multiple touch electrodes 10 in the same row include alternating third touch electrodes 103 and fourth touch electrodes 104, and multiple touch electrodes 10 in the same column include alternating third touch electrodes 103 and fourth touch electrodes 104. The first gap 11 and the second gap 12 of the third touch electrode 103 are respectively located on the two opposite sides of the first touch subunit 1 along the first direction X, and the first gap 11 and the second gap 12 of the fourth touch electrode 104 are respectively located on the two opposite sides of the first touch subunit 1 along the second direction Y.

The touch module 20 in FIG. 6 includes multiple touch driving channels extending along the first direction X and multiple touch detection channels extending along the second direction Y. The driving method of touch module 20 in FIG. 6 can be the same as that of touch module 20 in FIG. 4.

Figure 7:
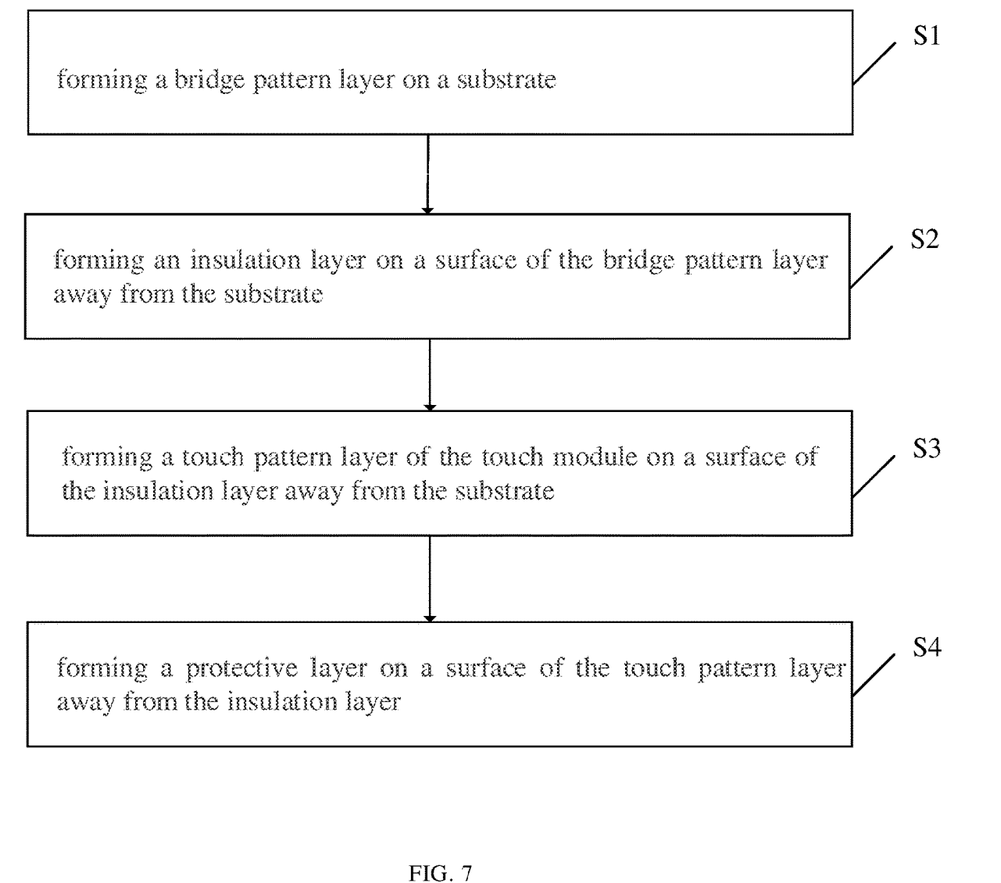
FIG. 7 is a flowchart of a method for making the touch module provided by an embodiment of the present disclosure.

Please referring to FIGS. 7 and 8, FIG. 7 is a flowchart of a method for making the touch module provided by an embodiment of the present disclosure. FIG. 8 is a cross-sectional structural schematic view of the touch module provided by an embodiment of the present disclosure.

Referring to FIG. 7, the present disclosure further provides a method for making the touch module 20, and the method includes the following operations:

operation S1: forming a bridge pattern layer on a substrate;

operation S2: forming an insulation layer on a surface of the bridge pattern layer away from the substrate;

operation S3: forming a touch pattern layer of the touch module 20 on a surface of the insulation layer away from the substrate; and operation S4: forming a protective layer on a surface of the touch pattern layer away from the insulation layer.

Regarding the operation S1, the substrate 201 can be a glass substrate or an OLED packaging layer. In specific embodiments, the physical vapor deposition (PVD) method is used to form a film on the substrate 201 for bridge the pattern layer 202, and the pattern of the bridge pattern layer 202 is obtained using a wet etching process. The material of the bridge pattern layer 202 can be a metal, such as silver (Ag), copper (Cu), aluminum (Al), molybdenum (Mo); or alloy materials of the aforementioned metals, such as aluminum niobium alloy (AlNd), molybdenum niobium alloy (MoNb), and so on. The bridge pattern layer 202 includes multiple first bridging parts 8 and multiple second bridging parts B. The length of the bridge pattern layer 202 is in a range from 1.5 μm to 2.5 μm, and the width is in a range from 4.5 μm to 5.5 μm.

Regarding the operation S2, in a specific embodiment, the insulation layer 203 is prepared using the Chemical Vapor Deposition (CVD) film formation process, as shown in FIG. 8. The insulation layer 203 is located on the bridge pattern layer 202 and includes two lap holes 203a that pass through the insulation layer 203.

The material of the insulating layer 203 is usually an insulating material, such as silicon oxide (SiOx), silicon nitride (SiNx), silicon oxynitride (SiON), and so on. The insulating layer 203 can also be a single layer, multiple layers or composite layers.

In an embodiment, the insulation layer 203 is the silicon nitride insulation layer 203.

Regarding operation S3, in a specific embodiment, the physical vapor deposition (PVD) process is used to form the film of the touch pattern layer 204, and the wet etching process is used to form the pattern of the touch pattern layer 204 of the touch module 20. As shown in FIG. 8, the touch pattern layer 204 of the touch module 20 is placed on the insulation layer 203 and electrically connected to the bridge pattern layer 202 through the lap hole 203a.

Regarding operation S4, in specific embodiments, the film formation process of Chemical Vapor Deposition (CVD) is used to form the protective layer 205.

The physical vapor deposition (PVD), chemical vapor deposition (CVD), wet etching and other composition processes mentioned in this embodiment are mature preparation processes in related technologies. In the description of this embodiment, "film formation" refers to a thin film is formed by deposition or other processes of a certain material on the substrate.

Figure 9:
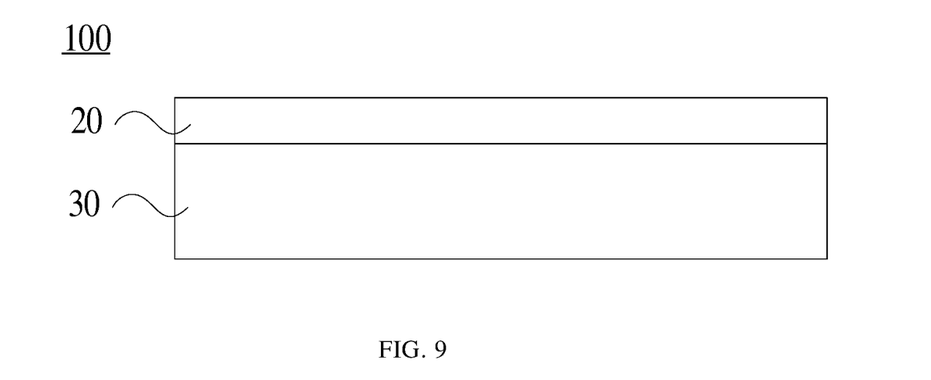
FIG. 9 is a structural schematic view of a touch display panel provided by an embodiment of the present disclosure.

Referring to FIG. 9, the present disclosure provides a touch display panel 100, and FIG. 9 is a structural schematic view of the touch display panel 100 provided by an embodiment of the present disclosure. The touch display panel 100 includes a display module 30 and the touch module 20, the display module 30 includes a display area, and the touch module 20 is located within the display area. The touch module 20 is the touch module 20 stated in any of the above embodiments. The touch module 20 can be located on one side of the display surface of the display module 30 or embedded into the display module 30.

The present disclosure provides the touch electrode 10, the touch module 20, and the touch display panel 100. The touch electrode 10 at least includes the first touch subunit 1, the second touch subunit 2, the third touch subunit 3, the first connecting part 4, the second connecting part 5, the third connecting part 6, the fourth connecting part 7, and the first bridging part 8. The first touch subunit 1 surrounds the second touch subunit 2, and the first touch subunit 1 defines the first gap 11 and the second gap 12. The first touch subunit 1 is divided into the first extension part 13 and the second extension part 14 through the first gap 11 and the second gap 12. The second touch subunit 2 surrounds the third touch subunit 3, and the second touch subunit 2 defines the third gap 21 and the fourth gap 22. The third gap 21 and the fourth gap 22 are configured to divide the second touch subunit 2 into the third extension part 23 and the fourth extension part 24. The first connecting part 4 passes through the third gap 21 and is connected to the first extension part 13 and the third touch subunit 3, and the second connecting part 5 passes through the fourth gap 22 and is connected to the second extension part 14 and the third touch subunit 3, so that the first extension part 13 is electrically connected to the second extension part 14 through the third touch subunit 3. The third connecting part 6 is electrically connected to the second touch subunit 2 and passes through the first gap 11 to extend beyond the area formed by the first touch subunit 1. The fourth connecting part 7 is electrically connected to the second touch subunit 2 and passes through the second gap 12 to extend beyond the area formed by the first touch subunit 1. The third extension part 23 is electrically connected to the fourth extension part 24 through the first bridging part 8.

The touch electrode unit 20A includes two first touch electrodes 101 arranged along the first direction X and two second touch electrodes 102 arranged along the second direction Y. The touch module 20 includes multiple touch electrode units 20A arranged in an array, that is, the touch module 20 includes multiple touch electrodes 10. The multiple touch electrodes 10 are arranged in an array, and connected to form multiple touch driving channels extending along the first direction X and multiple touch detection channels extending along the second direction Y. The first touch subunit 1, the second touch subunit 2, and the third touch subunit 3 intersect with each other, which increases the effective touch area. By shortening the length and width of the first bridging part 8, the metal density inside the touch electrode 10 is effectively reduced, the display effect is improved, and the visibility of the metal bridging part inside of the touch electrode 10 is reduced, thereby improving the performance of the product using the touch display panel 100. The touch driving channel and touch detection channel are formed in the first direction X and the second direction Y, and the touch driving channel and touch detection channel are insulated from each other, so that each touch electrode unit 20A has the touch driving channel and the touch detection channel, thereby achieving the function of multi-point control positioning, increasing the single point capacitance value, recognition accuracy, and touch sensitivity. Under some special conditions, such as wearing gloves, gesture recognition and other application scenarios, the touch area and recognition accuracy sensitivity have increased, which is conducive to the user experience.

The touch display panel 100 of the present disclosure can be applied to various electronic devices with touch functions, such as mobile phones, tablets, digital cameras, navigation devices, and so on. The implementation example of the present disclosure does not impose special restrictions on the specific form and application scenarios of the touch display panel 100 mentioned above.

The present disclosure provides a touch electrode, a touch module, and a touch display panel. The touch electrode at least includes a first touch subunit, a second touch subunit, a third touch subunit, a first connecting portion, a second connecting portion, a third connecting portion, a fourth connecting portion, and a first bridging part. The first touch subunit surrounds the second touch subunit and defines a first gap and a second gap. The first touch subunit is divided into a first extension part and a second extension part through the first gap and the second gap. The second touch subunit surrounds the third touch subunit and defines a third gap and a fourth gap. The third gap and the fourth gap are used to divide the second touch subunit into a third extension part and a fourth extension part. The first connecting part passes through the third gap and connects the first extension part and the third touch subunit, and the second connecting part passes through the fourth gap and connects the second extension part and the third touch subunit, so that the first extension part and the second extension part are electrically connected through the third touch subunit. The third connecting part is electrically connected to the second touch subunit and passes through the first gap to extend beyond the area formed by the first touch subunit. The fourth connecting part is electrically connected to the second touch subunit and passes through the second gap to extend beyond the area formed by the first touch subunit. The third extension part and the fourth extension part are electrically connected through the first bridging part. The first touch subunit and the third touch subunit of the touch electrode form a channel, and the second touch subunit forms another channel, so that in the touch module formed by the touch electrode, the touch electrodes in the same row include both driving channels and detection channels, and the touch electrodes in the same column include both driving channels and detection channels, thereby greatly improving the effective area of touch and increasing the single point capacitance value, improving recognition accuracy, sensitivity and touch performance, which can be used to broaden application scenarios in practical use.

For those skilled in the art, it is evident that the present disclosure is not limited to the details of the exemplary embodiments mentioned above, and can be implemented in other specific forms without departing from the spirit or basic features of the present disclosure. Therefore, from any perspective, the embodiments should be regarded as exemplary and non-restrictive. The scope of the present disclosure is limited by the accompanying claims rather than the above description, and therefore aims to include all variations within the meaning and scope of the same elements of the claims within the present disclosure. Any accompanying drawings in the claims should not be regarded as limiting the claims involved.

The above is only the implementation method of the present disclosure and does not limit the patent scope of the present disclosure. Any equivalent structure or equivalent process transformation made using the description and accompanying drawings of the present disclosure, or directly or indirectly applied in other related technical fields, are equally included in the scope of patent protection of the present disclosure.

What is claimed is:
1. A touch electrode, comprising:
a first touch subunit defining a first gap and a second gap, wherein the first touch subunit is divided into a first extension part and a second extension part by the first gap and the second gap;

a second touch subunit defining a third gap and a fourth gap, wherein the second touch subunit is divided into a third extension part and a fourth extension part by the third gap and the fourth gap;

a third touch subunit, wherein the first touch subunit surrounds the second touch subunit, and the second touch subunit surrounds the third touch subunit;

a first connecting part, wherein the first connecting part passes through the third gap and is connected to the first extension part and the third touch subunit;

a second connecting part, wherein the second connecting part passes through the fourth gap and is connected to the second extension part and the third touch subunit, so that the first extension part is electrically connected to the second extension part through the third touch subunit;

a third connecting part electrically connected to the second touch subunit and passing through the first gap to extend beyond an area formed by the first touch subunit;

a fourth connecting part electrically connected to the second touch subunit and passing through the second gap to extend beyond an area formed by the first touch subunit; and a first bridging part, wherein the third extension part is electrically connected to the fourth extension part through the first bridging part.

2. The touch electrode as claimed in claim 1, further comprising an insulation layer having a first side and a second side opposite to the first side, wherein the first touch subunit, the second touch subunit, and the third touch subunit are located on the first side and on the same layer; and the first bridging part is located on the second side.

3. The touch electrode as claimed in claim 1, wherein outer contours of the first touch subunit, the second touch subunit, and the third touch subunit are quadrilateral; the first gap and the second gap are respectively arranged on two adjacent or opposite sides of the first touch subunit; and the third gap and the fourth gap are respectively arranged on two adjacent sides or opposite sides of the second touch subunit.

4. The touch electrode as claimed in claim 3, wherein outer contours of the first touch subunit, the second touch subunit, and the third touch subunit are diamond shaped; and the first gap and the second gap are respectively arranged on two adjacent sides of the first touch subunit.

5. The touch electrode as claimed in claim 1, wherein the touch electrode only comprises one first bridging part, the first bridging part corresponds to the third gap or the fourth gap, and the third extension part and the fourth extension part are electrically connected through the first bridging part; or the touch electrode comprises two first bridging parts respectively corresponding to the third gap and the fourth gap, the third extension part and the fourth extension part are electrically connected at the third gap through one first bridging part, and the third extension part and the fourth extension part are electrically connected at the fourth gap through the other first bridging part.

6. A touch module, comprising:

a plurality of touch electrodes arranged in an array and connected to form a plurality of touch driving channels extending along a first direction and a plurality of touch detection channels extending along a second direction, wherein the first direction intersects with the second direction; and each of the plurality of touch electrodes comprises:

a first touch subunit defining a first gap and a second gap, wherein the first touch subunit is divided into a first extension part and a second extension part by the first gap and the second gap;

a second touch subunit defining a third gap and a fourth gap, wherein the second touch subunit is divided into a third extension part and a fourth extension part by the third gap and the fourth gap;

a third touch subunit, wherein the first touch subunit surrounds the second touch subunit, and the second touch subunit surrounds the third touch subunit;

a first connecting part, wherein the first connecting part passes through the third gap and is connected to the first extension part and the third touch subunit;

a second connecting part, wherein the second connecting part passes through the fourth gap and is connected to the second extension part and the third touch subunit, so that the first extension part is electrically connected to the second extension part through the third touch subunit;

a third connecting part electrically connected to the second touch subunit and passing through the first gap to extend beyond an area formed by the first touch subunit;

a fourth connecting part electrically connected to the second touch subunit and passing through the second gap to extend beyond an area formed by the first touch subunit; and a first bridging part, wherein the third extension part is electrically connected to the fourth extension part through the first bridging part.

7. The touch module as claimed in claim 6, wherein the plurality of touch electrodes comprise a plurality of first touch electrodes and a plurality of second touch electrodes, the touch module comprises a plurality of touch electrode units arranged in an array, the touch electrode units comprise:

two first touch electrodes arranged along the first direction;

two second touch electrodes arranged along the second direction; the plurality of touch electrode units are arranged on the same layer, the first direction is perpendicular to the second direction, the first touch subunit and the third touch subunit of the first touch electrode serve as the touch driving channels, and the second touch subunit of the first touch electrode serves as the touch detection channel; the second touch subunit of the second touch electrode serves as the touch driving channel, and the first touch subunit and the third touch subunit of the second touch electrode serve as the touch detection channel.

8. The touch module as claimed in claim 7, wherein the touch electrode unit further comprises a fifth connecting part, the fifth connecting part and the touch electrode are arranged on the same layer, and the first touch subunits of two first touch electrodes of the same touch electrode unit are electrically connected through the fifth connecting part; and the first touch subunits of two second touch electrodes of the same touch electrode unit are electrically connected through the second touch subunit of the first touch electrode.

9. The touch module as claimed in claim 8, further comprising a plurality of second bridging parts, wherein the plurality of touch electrode units comprise:

a plurality of first touch electrode units arranged in a plurality of rows along the first direction;

a plurality of second touch electrode units arranged in a plurality of columns along the second direction;

the first touch subunits of two adjacent first touch electrode units in the same row are electrically connected through the second touch subunits of adjacent second touch electrode units; and the first touch subunits of two adjacent second touch electrode units in the same column are electrically connected through the second bridging part.

10. The touch module as claimed in claim 6, wherein the each of the plurality of touch electrodes further comprises an insulation layer having a first side and a second side opposite to the first side, wherein the first touch subunit, the second touch subunit, and the third touch subunit are located on the first side and on the same layer; and the first bridging part is located on the second side.

11. The touch module as claimed in claim 6, wherein outer contours of the first touch subunit, the second touch subunit, and the third touch subunit are quadrilateral; the first gap and the second gap are respectively arranged on two adjacent or opposite sides of the first touch subunit; and the third gap and the fourth gap are respectively arranged on two adjacent sides or opposite sides of the second touch subunit.

12. The touch module as claimed in claim 11, wherein outer contours of the first touch subunit, the second touch subunit, and the third touch subunit are diamond shaped; and the first gap and the second gap are respectively arranged on two adjacent sides of the first touch subunit.

13. The touch module as claimed in claim 6, wherein the touch electrode only comprises one first bridging part, the first bridging part corresponds to the third gap or the fourth gap, and the third extension part and the fourth extension part are electrically connected through the first bridging part; or the touch electrode comprises two first bridging parts respectively corresponding to the third gap and the fourth gap, the third extension part and the fourth extension part are electrically connected at the third gap through one first bridging part, and the third extension part and the fourth extension part are electrically connected at the fourth gap through the other first bridging part.

14. A touch display panel, comprising:

a display module comprising a display area;

a touch module located within the displayed area, wherein the touch module —comprises a plurality of touch electrodes, the plurality of touch electrodes are arranged in an array and connected to form a plurality of touch driving channels extending along a first direction and a plurality of touch detection channels extending along a second direction, the first direction intersects with the second direction, and each of the plurality of touch electrodes comprises:

a first touch subunit defining a first gap and a second gap, wherein the first touch subunit is divided into a first extension part and a second extension part by the first gap and the second gap;

a second touch subunit defining a third gap and a fourth gap, wherein the second touch subunit is divided into a third extension part and a fourth extension part by the third gap and the fourth gap;

a third touch subunit, wherein the first touch subunit surrounds the second touch subunit, and the second touch subunit surrounds the third touch subunit;

a first connecting part, wherein the first connecting part passes through the third gap and is connected to the first extension part and the third touch subunit;

a second connecting part, wherein the second connecting part passes through the fourth gap and is connected to the second extension part and the third touch subunit, so that the first extension part is electrically connected to the second extension part through the third touch subunit;

a third connecting part electrically connected to the second touch subunit and passing through the first gap to extend beyond an area formed by the first touch subunit;

a fourth connecting part electrically connected to the second touch subunit and passing through the second gap to extend beyond an area formed by the first touch subunit; and a first bridging part, wherein the third extension part is electrically connected to the fourth extension part through the first bridging part.

15. The touch display panel as claimed in claim 14, wherein the plurality of touch electrodes comprise a plurality of first touch electrodes and a plurality of second touch electrodes, the touch module comprises a plurality of touch electrode units arranged in an array, the touch electrode units comprise:

two first touch electrodes arranged along the first direction;

two second touch electrodes arranged along the second direction; the plurality of touch electrode units are arranged on the same layer, the first direction is perpendicular to the second direction, the first touch subunit and the third touch subunit of the first touch electrode serve as the touch driving channels, and the second touch subunit of the first touch electrode serves as the touch detection channel; the second touch subunit of the second touch electrode serves as the touch driving channel, and the first touch subunit and the third touch subunit of the second touch electrode serve as the touch detection channel.

16. The touch display panel as claimed in claim 15, wherein the touch electrode unit further comprises a fifth connecting part, the fifth connecting part and the touch electrode are arranged on the same layer, and the first touch subunits of two first touch electrodes of the same touch electrode unit are electrically connected through the fifth connecting part; and the first touch subunits of two second touch electrodes of the same touch electrode unit are electrically connected through the second touch subunit of the first touch electrode.

17. The touch display panel as claimed in claim 16, further comprising a plurality of second bridging parts, wherein the plurality of touch electrode units comprise:

a plurality of first touch electrode units arranged in a plurality of rows along the first direction;

a plurality of second touch electrode units arranged in a plurality of columns along the second direction;

the first touch subunits of two adjacent first touch electrode units in the same row are electrically connected through the second touch subunits of adjacent second touch electrode units; and the first touch subunits of two adjacent second touch electrode units in the same column are electrically connected through the second bridging part.

18. The touch display panel as claimed in claim 14, wherein the each of the plurality of touch electrodes further comprises an insulation layer having a first side and a second side opposite to the first side, wherein the first touch subunit, the second touch subunit, and the third touch subunit are located on the first side and on the same layer; and the first bridging part is located on the second side.

19. The touch display panel as claimed in claim 14, wherein outer contours of the first touch subunit, the second touch subunit, and the third touch subunit are quadrilateral; the first gap and the second gap are respectively arranged on two adjacent or opposite sides of the first touch subunit; and the third gap and the fourth gap are respectively arranged on two adjacent sides or opposite sides of the second touch subunit.

20. The touch display panel as claimed in claim 19, wherein outer contours of the first touch subunit, the second touch subunit, and the third touch subunit are diamond shaped; and the first gap and the second gap are respectively arranged on two adjacent sides of the first touch subunit.

* * * * *